United States Patent Office 3,250,596
Patented May 10, 1966

3,250,596
METHOD FOR DETERMINING THE VIRUS ADSORPTIVE CAPACITY OF ALUMINUM OXIDE
Alfred Grafe, Weinheim, Germany, assignor to C. F. Boehringer & Soehne Gesellschaft mit beschrankter Haftung, Mannheim-Waldhof, Germany, a corporation of Germany
No Drawing. Filed Apr. 8, 1963, Ser. No. 271,447
11 Claims. (Cl. 23—230)

This invention relates to new and useful improvements in aluminum oxide depot vaccines.

Certain aluminum oxides designated as $\gamma$-aluminum oxides have been used for the production of depot vaccines. Such depot vaccines have the advantage of a considerably improved and stabilized effectiveness compared with vaccines which are not combined with aluminum oxide or which are used in association with aluminum hydroxide. These depot vaccines are prepared by prolonged shaking or other thorough agitation such as for 20 minutes of the finely divided aluminum oxide with the desired vaccine solution. Though it is doubtful whether true adsorption phenomena are present, these aluminum oxide depot vaccines have been referred to as aluminum oxide and specifically $\gamma$-aluminum oxide adsorbate vaccines. These vaccines may contain as antigens a member of the group consisting of the viruses, bacteria, the endotoxines, the ectotoxins and the corresponding toxoids together with a finely dispersed aluminum oxide not injurious to the human and animal tissues, and suitable $\gamma$-aluminum oxides have been stated to possess a molar surface of about 40,000 to 80,000 m.$^2$, there being additionally present substances for buffering the vaccine to the desired pH value and rendering it substantially isotonic, and water as the liquid medium of the vaccine. Measurements in accordance with the BET method conventional for the determination of molar surfaces have shown that surface sizes between $10^4$ and $2\times10^4$ m.$^2$ per mol are applicable. The components of the vaccine are normally so adjusted that 1 ml. of the mixture contains about $10^6$–$10^9$ viruses or bacteria or the equivalent quantity of the toxin or toxoid (i.e., about 50 to 500 flocculation units) and a quantity of the aluminum oxide possessing for instance a surface of about 2–20 m.$^2$. The thorough agitation of the components is carried out for about 20 to 40 minutes at a temperature of about 0 to 30° C. and preferably below 10° C. The surface designation for the $\gamma$-aluminum oxide in these vaccines defines the aggregate of the surfaces of the particles of aluminum oxide such as that prepared in accordance with Fricke et al., Berichte der deutschen chem. Gesellschaft, 1937, page 2318. Expressed in parts by weight the particular alumnium oxide is present in the above described vaccines to a quantity of about 2.5 to 50 mg. per 1 ml. of the vaccine. Depot vaccines of the above described type are for instance disclosed in Austrian Patent No. 216,142 of July 10, 1961.

It has been found that aluminum oxides and especially those designated as $\gamma$-aluminum oxides in the said Austrian patent and in accordance with the disclosure of Fricke et al. do not yield vaccine products of uniform potency. This is the result of variations in the capacity in antigen take-up of given aluminum oxides even though they are similar in if not of substantially the same order of aggregate molar surface of particles. This is for instance illustrated in Table I showing the polio virus adsorption capacity of 3 different $\gamma$-aluminum oxides. All of the $\gamma$-aluminum oxide samples of Table I were prepared in accordance with that Austrian patent and that Fricke literature reference by calcining an aluminum hydroxide gel for two hours at 600° C. in a preheated oven. All three samples had a surface size according to the method of Fricke of 62,300 m.$^2$ per mol.

TABLE I

| $\gamma$-Aluminum oxide sample | Virus content of the Al$_2$O$_3$-free vaccine (percent) | Adsorbed virus content (percent) |
|---|---|---|
| 1 | 100 | |
| 2 | 64 | 36 |
|  | 38 | 62 |
| 3 | 30 | 70 |

The adsorption capacity of the aluminum oxides against polio virus was tested utilizing the refractometric method described in my United States Patent No. 3,117,061. A trivalent polio vaccine was thoroughly agitated with 10 mg. of the particular $\gamma$-aluminum oxide per ml. vaccine solution on an automatic shaking device for 60 minutes in a cool-room (temperature less than 10° C.). The $\gamma$-aluminum oxide was then removed by centrifuging for 1 hour at 3,000 r.p.m. The supernatant liquids were then subjected to the refractometric virus determination method of my said co-pending patent, as was also the aluminum oxide free polio vaccine. The refractometrically determined virus content of the latter was then considered 100 and the combination or adsorption capacity of the $\gamma$-aluminum oxide samples was determined relative thereto.

Rat tests according to Ghendon et al., Acta Virologica, 3/1959, pages 250–252, show as illustrated in Table II that the different capacities of the aluminum oxide samples to take up different amounts of virus correspond to different antigenic effectiveness.

TABLE II

| $\gamma$-Aluminum oxide sample | Adsorbed virus content (percent) | Minimum amount releasing antibody production (ml.) |
|---|---|---|
| 1 | | 0.1 |
| 2 | 36 | 0.2 |
|  | 62 | 0.4 |
| 3 | 70 | 0.5 |

A number of solutions to be injected were prepared each varying in the content of the component vaccine. Thus a series of solutions was prepared by using 0.1 ml. of the vaccine and 0.9 ml. diluent medium, a second with 0.2 ml. vaccine and 0.8 ml. diluent medium etc. through to 0.9 ml. of the vaccine and 0.1 ml. of diluent medium. The vaccine used for the tests and diluted with the medium constituted in each case the aluminum oxide-free solution after centrifuging. In accordance with this test, rats of a weight of about 250 grams received a single injection of 1 ml. intraperitoneally of the diluted vaccines in comparison with another group of rats receiving the aluminum oxide-free control vaccine. Each group of test animals consisted of 4 rats and in each case that minimum amount of the supernatant vaccine solution of the three $\gamma$-aluminum oxide samples and that of the original aluminum oxide-free vaccine was determined which is necessary to trigger the antibody production for the type II polio virus. As will be seen from Table II the aluminum oxide samples having the lesser take-up capacity for virus require also a lesser amount of the supernatant vaccine solution for the triggering of antibody formation.

It has been hitherto impossible to predetermine any particular aluminum oxide with respect to its antigen combining capacity except by the actual take-up capacity determination coupled with cumbersome and time-consuming animal testing. The production problems thereby created are compounded by the fact that aluminum oxides such as those designated as γ-oxides have proven to vary widely in their antigen take-up capacity even though the particular aluminum oxide material is obtained from the same source of production.

It is an object of this invention to prepare aluminum oxide depot vaccines of predictable uniform potency without necessity of animal testing. This and further objects of this invention will be apparent from the following description:

It has been discovered that an ion-free aqueous albumin solution can furnish a reliable indication for the virus take-up capacity of a given aluminum oxide. Thus when contacting such an aqueous albumin solution with a given aluminum oxide the take-up capacity of the latter for albumin bears a direct relationship to the take-up capacity of that aluminum oxide for viruses of the non-lipoid type such as polio. In other words when the aluminum oxide shows a low albumin take-up capacity it will also possess a relatively low virus (non-lipoid type) take-up capacity. It will on the other hand indicate for medium and high albumin take-up capacities similarly medium and high take-up capacities for non-lipoid type viruses. Generally a minimum of 30% and preferably 50% of albumin take-up capacity of a given aluminum oxide such as γ-aluminum oxide material will give satisfactorily high virus take-up capacities for the same aluminum oxide.

*Example I*

A 5 volume percent calf serum solution in demineralized water is prepared; the albumin content of that solution amounts to 0.2624 percent by weight. Samples are taken from this basic solution and are admixed with 10 mg. of the particular aluminum oxide to be tested per ml. of serum solution. The aluminum oxide is that described in connection with Tables I and II. The aluminum oxide containing samples are then thoroughly agitated by automatic shaking for 60 minutes in a cool-room. The aluminum oxide is then removed by centrifugation for 60 minutes at 3,000 r.p.m. whereupon the albumin content is measured in the remaining liquid by refractometric method to give the indices of refraction as a direct measurement of concentration.

The preferred refractometer which has proved to be especially suitable is the Zeiss immersion refractometer. The determination of the index of refraction is carried out at a constant temperature between 22.5° C. and 24.5° C. The virus suspension and the other liquids to be measured are adjusted to said temperature about one hour before determination is carried out.

The first step of the determination is to adjust the refractometer to a constant value for aqua dest. (In the following examples this value was 13.80.) An interval of about 2 minutes should be maintained between each determination in order to allow an equalization of the temperature. It is also recommended to control the index of refraction of the distilled water, for instance, each time after three measurements. To achieve the desired accuracy, each determination is repeated several times, for instance, ten times and the arithmetic mean of the resulting repeated measurements is calculated.

The 5% calf serum solution was determined in the just indicated manner to have a refractometric value of 15.55±0.05 measuring units which correspond to a refractive index of substantially 1.33342 (22.8° C.). Comparisons are made in a similar manner with the base solution for which the refractometric reading was set at 100 so that the albumin contents of the centrifuged solutions are in each case relative to this value of 100.

When testing the γ-aluminum oxides used in connection with the illustrations set forth in Example I and in Tables I and II their relative polio virus take-up in comparison with albumin take-up is shown in the following Table III.

TABLE III

| γ-Aluminum oxide sample | Albumin take-up (percent) | Polio virus take-up (percent) |
|---|---|---|
| 1 | 17 | 36 |
| 2 | 43 | 62 |
| 3 | 51 | 70 |
| 4 | 8 | 20 |
| 5 | 35 | 55 |
| 6 | 40 | 56 |
| 7 | 10 | 19 |
| 8 | 58 | 78 |
| 9 | 28 | 45 |
| 10 | 47 | 60 |
| 11 | 22 | 41 |
| 12 | 41 | 56 |
| 13 | 53 | 69 |

The virus take-up is determined in each case refractometrically as above outlined in Example I and in accordance with the method set forth in my U.S. Patent No. 3,117,061.

As is there apparent the respective take-ups of polio virus and albumin show a direct relation to one another. Thus it is possible with this in vitro method to select high and highest albumin take-up aluminum oxides because only these will produce the correspondingly high increase in effectiveness desired for a depot vaccine.

The following Table IV shows a number of γ-aluminum oxides all prepared by the same method according to Fricke and the said Austrian patent as above set forth. In each case the albumin take-up is shown and the table is intended to demonstrate the wide variations in albumin take-up and thus in corresponding virus take-up despite the fact that the preparations were prepared in the same manner, the only difference being that the aluminum hydroxide gels were from different batches of production.

TABLE IV

| γ-Aluminum oxide sample | Albumin take-up (percent) | γ-Aluminum oxide sample | Albumin take-up (percent) |
|---|---|---|---|
| 100 | 34 | 62/27 | 35 |
| 104 | 22 | 62/28 | 47 |
| 105 | 33 | 62/29 | 37 |
| 106 | 35 | 62/30 | 32 |
| 17/57 | 27 | 62/31 | 31 |
| 58/1 | 17 | | |
| 58/2 | 26 | 402/49 | 31 |
| 58/3 | 36 | 402/52 | 37 |
| 58/4 | 43 | 402/53 | 26 |
| 58/5 | 26 | 402/54 | 41 |
| 58/6 | 29 | 402/55 | 36 |
| 58/7 | 31 | 402/60 | 45 |
| 58/8 | 37 | 402/61 | 43 |
| 58/9 | 28 | 402/62 | 46 |
| 58/10 | 37 | 402/63 | 54 |
| 58/11 | 43 | 402/64 | 42 |
| 58/12 | 36 | 402/65 | 42 |
| 58/13 | 40 | 402/66 | 58 |
| 58/14 | 36 | 402/67 | 48 |
| 58/15 | 51 | 402/68 | 45 |
| 58/16 | 44 | 402/69 | 41 |
| 58/17 | 37 | 402/70 | 46 |
| 58/18 | 47 | A/1 | 21.5 |
| 58/19 | 48 | A/2 | 25.5 |
| 58/20 | 46 | A/3 | 19.5 |
| 58/21 | 45 | A/4 | 28.0 |
| 58/22 | 47 | A/5 | 14.5 |
| 58/23 | 35 | A/6 | 24.0 |
| 58/24 | 35 | A/7 | 22.0 |
| 58/25 | 32 | A/8 | 11.5 |
| 58/26 | 32 | A/9 | 19.0 |
| 58/27 | 32 | A/10 | 27.0 |
| 58/28 | 32 | A/11 | 17.0 |
| 58/29 | 22 | A/12 | 27.0 |
| 58/30 | 38 | A/13 | 14.0 |
| 58/31 | 10 | A/14 | 21.0 |
| 58/32 | 35 | A/15 | 25.5 |
| 58/33 | 30 | A/16 | 22.5 |
| 58/34 | 38 | A/17 | 21.0 |
| 62/12 | 34 | A/18 | 27.5 |
| 62/13 | 31 | A/19 | 21.5 |
| 62/14 | 30 | A/20 | 21.5 |
| 62/15 | 33 | A/21 | 25.5 |
| 62/16 | 44 | A/22 | 24.5 |
| 62/17 | 43 | A/23 | 27.5 |
| 62/18 | 42 | A/24 | 26.0 |
| 62/19 | 36 | A/25 | 28.0 |
| 62/20 | 36 | A/26 | 29.5 |
| 62/21 | 39 | A/27 | 28.5 |
| 62/22 | 40 | A/28 | 34.5 |
| 62/23 | 37 | A/29 | 27.5 |
| 62/24 | 47 | A/30 | 30.0 |
| 62/25 | 40 | A/31 | 30.0 |
| 62/26 | 40 | A/33 | 18.0 |

In order to be in all cases certain that a given aluminum oxide such as γ-aluminum oxide does not only possess the desired take-up capacity for non-lipoid type viruses such as polio but also possess a high take-up capacity for lipoid type viruses such as myxo and measles viruses, it is within a preferred embodiment of the invention to have the aluminum oxide to be selected also conform to my cephalin take-up test. This test is based upon the discovery that aluminum oxide such as γ-aluminum oxide will adsorb cephalin from an aqueous solution in direct relation to the take-up capacity of that aluminum oxide for lipoid type viruses having lipoids on their surface such as myxo and measles viruses. In accordance with this test the particular aluminum oxide sample should be capable of taking up at least 10% of the cephalin and will then have a correspondingly high and highest take-up capacity for lipoid type viruses to yield efficient depot vaccines.

*Example II*

An 0.4% by weight cephalin solution in demineralized water, i.e., an ion-free solution is produced. The 0.4% cephaline solution was measured for a refractometric value of 15.48±0.05 in accordance with the method set forth in Example I. This corresponds to a refractive index of substantially 1.33339 (22.8° C.). Samples taken from this basic solution are admixed with the aluminum oxides to be tested same as those in Example I, using 10 mg. of the aluminum oxide for each ml. of solution. The aluminum oxide containing product is then shaken in a cool-room on an automatic shaker for about 1 hour. Thereafter the aluminum oxide is removed by centrifuging for 1 hour at 3,000 r.p.m. The oxide-free liquid is then subjected to refractometric measurement at about 22.5–24.5° C. with an immersion refractometer, the values obtained being compared with those similarly secured with the cephalin basic solution. The refractometer value of the latter is set at 100 so that the values of the natant liquids from the aluminum oxide containing samples are in reference to this 100 value.

Table V sets forth a number of γ-aluminum oxide preparations made in accordance with Fricke and said Austrian patent as set forth in Example I hereof, all preparations being made by the same method and having substantially the same molar surface. There is further set forth in Table V the cephalin take-up for each sample and the corresponding virus take-up for a lipoid type virus, i.e., in the particular case of Newcastle disease virus. Other lipoid type viruses will give similar results.

TABLE V

| γ-Aluminum oxide sample | Cephalin take-up (percent) | Newcastle virus take-up (percent) |
|---|---|---|
| A/8 | 3 | 12 |
| A/9 | 7 | 19 |
| A/24 | 8 | 23 |
| A/25 | 10.5 | 24 |
| A/29 | 12.5 | 30 |
| A/33 | 10 | 25 |
| 402/66 | 18 | 42 |
| A/17 | 16 | 40 |
| A/6 | 4 | 11 |
| A/7 | 1.5 | 10 |
| A/23 | 9 | 23 |
| A/27 | 16 | 39 |

The cephalin take-up and Newcastle virus take-up determinations of the values given in Table V were made in the same manner refractometrically as previously described in connection with the albumin take-up and polio virus take-up.

There are set forth in the following Table VI a number of γ-aluminum oxide samples prepared in the same manner as those heretofore referred to, i.e., by the same methods giving substantially the same surface sizes, the table setting forth in each case the corresponding albumin take-up and cephalin take-up values determined by refractometric method as herein before described.

TABLE VI

| γ-Aluminum oxide sample | Albumin take-up (percent) | Cephalin take-up (percent) |
|---|---|---|
| A/8 | 11.5 | 3.0 |
| A/13 | 14.0 | 2.5 |
| A/5 | 14.5 | 2.0 |
| A/11 | 17.0 | 5.0 |
| A/33 | 18.0 | 10.0 |
| A/9 | 19.0 | 7.0 |
| A/3 | 19.5 | 14.0 |
| A/14 | 21.0 | 2.0 |
| A/17 | 21.0 | 16.5 |
| A/1 | 21.5 | 12.0 |
| A/19 | 21.5 | 1.5 |
| A/20 | 21.5 | 1.5 |
| A/7 | 22.0 | 1.5 |
| A/16 | 22.5 | 7.0 |
| A/6 | 24.0 | 4.0 |
| A/22 | 24.5 | 9.5 |
| A/21 | 24.5 | 8.5 |
| A/2 | 25.5 | 12.5 |
| A/15 | 25.5 | 6.5 |
| A/24 | 26.0 | 8.0 |
| A/12 | 27.0 | 2.5 |
| A/10 | 27.0 | 2.5 |
| A/29 | 27.5 | 12.5 |
| A/18 | 27.5 | 1.5 |
| A/23 | 27.5 | 9.0 |
| A/25 | 28.0 | 10.5 |
| A/4 | 28.0 | 9.5 |
| A/27 | 28.5 | 16.0 |
| A/26 | 29.5 | 5.0 |
| A/31 | 30.0 | 9.0 |
| A/30 | 30.0 | 11.0 |
| A/28 | 34.5 | 14.5 |
| 402/66 | 58.0 | 18.0 |

The determinations for lipoid type viruses herein above described for Newcastle virus may be equally made with comparable results when substituting influenza virus, measles virus and mumps or other lipoid type viruses of similar or related nature. The same is true of the albumin test which is applicable not only to polio viruses but also to viruses of the type of Coxsackie or of foot and mouth-disease or other viruses of similar type or nature. It is within the scope of the invention to predetermine suitable aluminum oxide preparations to be solely or preferably usable for non-lipoid type viruses or for lipoid type viruses. It is on the other hand possible and sometimes desirable to so select the particular aluminum oxide such as γ-aluminum oxide that the same will be satisfactorily usable for both types of vaccines. It was found that the extent of albumin take-up of a given aluminum oxide is not necessarily equivalent with the extent of cephalin take-up of the same aluminum oxide. This is apparent from a comparison of the albumin take-up and cephalin take-up values of Table VI for the A series of γ-aluminum oxide preparations. Of these only the products A 30, A 28 and 402/66 have simultaneously a satisfactory albumin adsorption and cephalin adsorption to be useful as aluminum oxide preparations capable of giving satisfactory depot vaccines with both non-lipoid and lipoid type viruses.

Though the particular concentrations of the albumin and cephalin solutions, respectively, are not critical they should be such that after centrifuging the remaining liquid is readily refractometrically determinable. When it is desired to determine both an albumin and a cephalin take-up for a given aluminum oxide preparation it is desirable to so select the albumin concentration and the cephalin concentration that the refractometrically obtained values will not differ by substantially more than 7±2 measuring units which means that in that case the measured values are approximately comparable. This result is achieved when selecting the 5% by volume calf serum solution (i.e., 0.2624% by weight albumin solution) and the 0.4% by weight cephalin solution herein above mentioned. Within the broad scope of my invention I find it of advantage to use about 3 to 20 and preferably 6 to 12 mg. of aluminum oxide per ml. of aqueous medium, 0.15 to 0.75% by weight and preferably 0.25 to 0.50% by weight of albumin, and 0.2 to 1% by weight and preferably 0.4 to 0.6% by weight of cephalin.

I claim:
1. A method for determining the virus adsorption capacity of aluminum oxide, which method comprises thoroughly agitating finely divided aluminum oxide of high surface area with an ion-free aqueous solution of at least one member selected from the group consisting of albumin and cephalin, wherein the total amount of said group member in said solution is determinable, separating the resulting liquid phase from the solid phase, and quantitatively analyzing said liquid phase for determining the amount of said group member remaining dissolved therein, the difference between the total amount of said group member and the remaining amount representing the adsorption capacity of the aluminum oxide for the group member, said adsorption capacity having an approximately linear relationship to the adsorption capacity of the aluminum oxide for the virus, the values of the adsorption capacities increasing together, whereby the amount of said group member remaining dissolved relative to the total amount of said group member in said aqueous solution provides a measure of the virus adsorption capacity of said aluminum oxide.

2. Method according to claim 1 wherein said group member is cephalin.

3. Method according to claim 1 wherein said group member is albumin.

4. Method according to claim 3 wherein said albumin is present in said aqueous solution in an amount of 0.26% by weight.

5. Method according to claim 2 wherein said cephalin is present in said aqueous solution in an amount of 0.4% by weight.

6. Method according to claim 2 wherein said agitating is effected with a substantially-ion-free aqueous solution containing 0.15 to 0.75% by weight of albumin for every 3 to 20 mg. of aluminum oxide per ml.

7. Method according to claim 6 wherein said agitating is effected with a substantially-ion-free aqueous solution containing 0.2 to 1% by weight of cephalin for every 3 to 20 mg. of aluminum oxide per ml.

8. Method according to claim 6 wherein said agitating is effected with a substantially-ion-free aqueous solution containing 0.25% to 0.50% by weight of albumin for every 3 to 20 mg. of aluminum oxide per ml.

9. Method according to claim 6 wherein said agitating is effected with a substantially-ion-free aqueous solution containing 0.25% to 0.50% by weight of albumin for to 20 mg. of aluminum oxide per ml.

10. Method according to claim 6 wherein said agitating is effected with a substantially-ion-free aqueous solution containing 0.25 to 0.50% by weight of albumin for every 6 to 12 mg. of aluminum oxide per ml.

11. Method according to claim 6 wherein said agitating is effected with a substantially-ion-free aqueous solution containing 0.4 to 0.6% by weight of cephalin for every 6 to 12 mg. of aluminum oxide per ml.

References Cited by the Examiner
UNITED STATES PATENTS 2,712,986   7/1955   Huckabay _____ 210—31 X MORRIS O. WOLK, *Primary Examiner.*

JULIAN S. LEVITT, JOSEPH SCOVRONEK,
*Examiners.*

R. HUFF, *Assistant Examiner.*